United States Patent [19]

Little et al.

[11] E Re. 29,701

[45] Reissued Jul. 11, 1978

[54] TIMED BUZZER

[75] Inventors: Arthur J. Little, Springfield; William R. Mayer, Rochester, both of Ill.

[73] Assignee: Stewart-Warner Corporation, Chicago, Ill.

[21] Appl. No.: 786,680

[22] Filed: Apr. 11, 1977

Related U.S. Patent Documents

Reissue of:

[64] Patent No.: 4,003,043
Issued: Jan. 11, 1977
Appl. No.: 652,592
Filed: Jan. 26, 1976

[51] Int. Cl.[2] ..... G01K 1/08; G08B 3/00

[52] U.S. Cl. ..... 340/403; 340/309.1; 335/145

[58] Field of Search ..... 340/402, 403, 388, 309.1, 340/309.5, 309.6; 335/145

[56] References Cited

U.S. PATENT DOCUMENTS

| | | | |
|---|---|---|---|
| 3,728,658 | 4/1973 | Kasahara | 335/145 X |
| 3,760,411 | 9/1973 | Youhanaian | 340/402 X |
| 3,774,200 | 11/1973 | Heath | 340/402 X |
| 3,846,792 | 11/1974 | Haigh | 340/388 X |
| 3,938,143 | 2/1976 | Little | 340/402 |

*Primary Examiner*—Harold I. Pitts
*Attorney, Agent, or Firm*—Augustus G. Douvas; Dillis V. Allen

[57] ABSTRACT

A timed buzzer assembly having a rectangular base with four terminals insert molded in the base and a generally cup-shaped cover member over the base providing the housing. All of the terminals project through the base member with the armature of the buzzer supported on one terminal and the coil assembly of the buzzer supported on a second terminal. For the purpose of timing the buzzer and also controlling a warning light, a bimetal timer is provided having bimetal elements one supported on a third terminal and the other supported on the above referred to second terminal. The fourth terminal is a ground to which a heating element for the bimetal timer is connected.

11 Claims, 5 Drawing Figures

TIMED BUZZER

Matter enclosed in heavy brackets [ ] appears in the original patent but forms no part of this reissue specification; matter printed in italics indicates the additions made by reissue.

BACKGROUND OF THE PRESENT INVENTION

The modifications in the requirements for automotive seat belt warning systems have necessitated a redesign of these systems. More particularly, present day requirements for such systems include warning buzzers that terminate operation after a predetermined interval regardless of whether the seat belts are fastened and also a seat belt warning light that terminates operation after a predetermined interval regardless of whether the seat belts are fastened.

In the past, seat belt warning systems have included buzzer assemblies that continue operation until the seat belts have been fastened and such systems do not require any timing control. Such a buzzer is shown in the Little et al. U.S. Pat. No. 3,768,158 assigned to the assignee of the present invention.

It is a primary object of the present invention to provide a seat belt warning buzzer assembly that includes a timing mechanism in a simplified and low-cost construction.

SUMMARY OF THE PRESENT INVENTION

In accordance with the present invention, a timed seat belt warning buzzer assembly is provided that includes a buzzer assembly and a bimetal timing device both in a single housing in a simplified and improved manner. A generally rectangular base is provided having four terminals insert molded therein. All of the four terminals project into the housing either for the purpose of supporting one of the buzzer assembly elements or for providing easy electrical connection such as with the ground terminal. A generally cup-shaped housing member fits over the base member and envelopes the buzzer and timer. A projecting portion of the first terminal, connected to normally closed seat belt switch external to the buzzer assembly, supports the buzzer armature. A second terminal has an inside projection that supports the coil assembly. An inward projection of a third terminal, connected to the ignition switch, supports one element of two bimetal elements defining the timing device for the buzzer as well as for a warning light connected to the second terminal. The second bimetal element is fixed to and supported on an upward projection from the second terminal. A heater winding is provided around one of the bimetal elements and is electrically connected between the third terminal, i.e., the ignition terminal, and the four terminal which is ground so that the bimetal heater remains in operation whenever the ignition is on.

When the ignition is turned on, the bimetal elements remain closed for a predetermined period lighting the seat belt warning light connected to the second terminal regardless of belt switch condition. After a predetermined time delay, the heater will open the bimetal element contacts thereby turning off the warning light connected to the second terminal. If the normally closed seat belt switch is open, the buzzer will not operate at all but if the normally closed switch remains closed, the buzzer will operate through the timing elements and the ignition terminal until the heater opens the contacts and then the buzzer will also terminate operation with the warning light.

DETAILED DESCRIPTION OF THE PREFERRED EMBODIMENT

Figure 1:
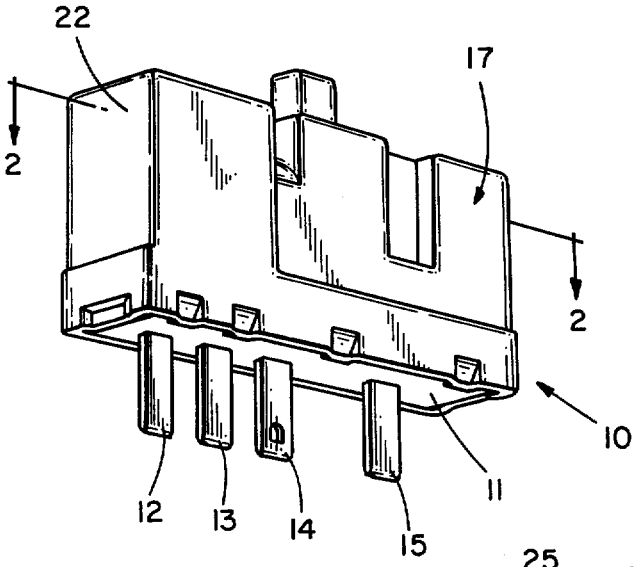
FIG. 1 is a prespective view of the present timed buzzer assembly.

As illustrated in the drawings, and particularly FIGS. 1 to 4, a timed buzzer assembly 10 is provided consisting generally of a rectangular base member 11 through which terminals 12, 13, 14 and 15 pass, a rectangularly cup-shaped housing member 17 surrounding a buzzer assembly 19 and a bimetal timing device 20.

The base member 11 is generally rectangular in construction and supports, through the terminals 12, 13, 14 and 15 all of the elements of the present buzzer assembly in a very simplified manner. Housing 17 is also generally rectangular and has sides 22 and 23 interconnected by a front panel 24 and a rear panel 25 with a top panel 27.

Figure 2:
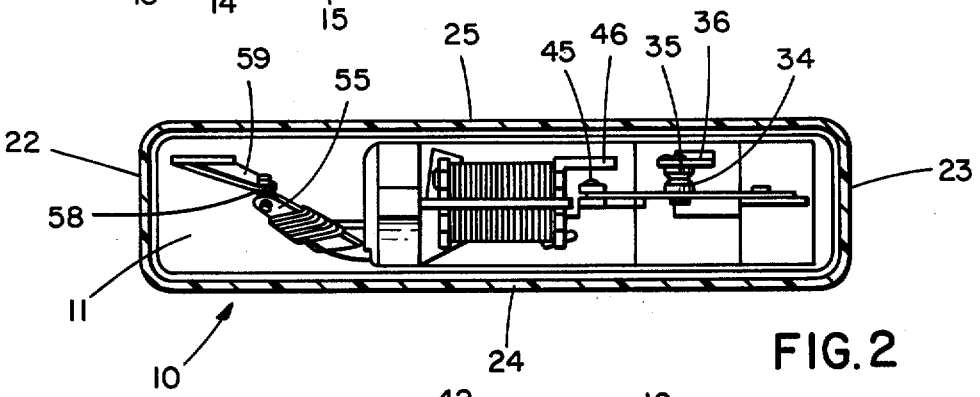
FIG. 2 is a cross-section of the buzzer assembly taken generally along line 2—2 of FIG. 1.

All of the terminals 12, 13, 14 and 15 are insert molded in base 11 and project completely therethrough. Terminal 15 is connected to a seat belt switch 28 and it has a portion 29 extending through the base 11 and an upwardly projecting portion 31 within housing member 17. An armature 32 is fixed to a flexible member 33 which is in turn fixed to the upward projection 31. Flexible member 33 permits armature 32 to have lateral movement to effect the buzzer sound as will appear hereinbelow. As seen in FIG. 2, the flexible member 33 has a contact 34 engaging a contact 35 on a contact member 36 shown clearly in FIG. 4. The contact member has a laterally extending portion 37 shown in FIG. 3 that is molded within the base 11 thereby supporting contact member 36.

The laterally extending portion 37 projects upwardly and has a portion 38 extending into the housing having a lug 40 engaging one end of a bobbin 41 defining a portion of coil assembly 42. One end of a coil 44 is connected to lug 40 for the purpose of providing a conductive path with the soil 44 through projection 38 to the contact member 36.

The armature 32 has a spherical projection 45 that repeatedly hits an axial projection 46 on the bobbin to produce the buzzer sound.

Figure 3:
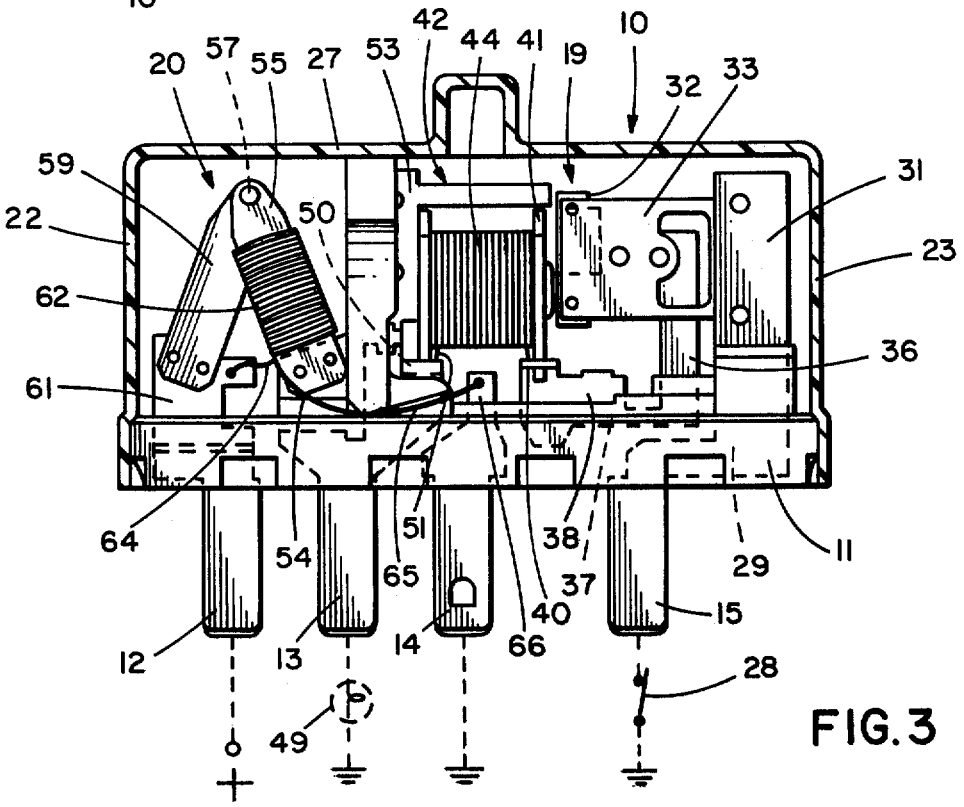
FIG. 3 is a longitudinal section of the present timed buzzer assembly.
Figure 4:
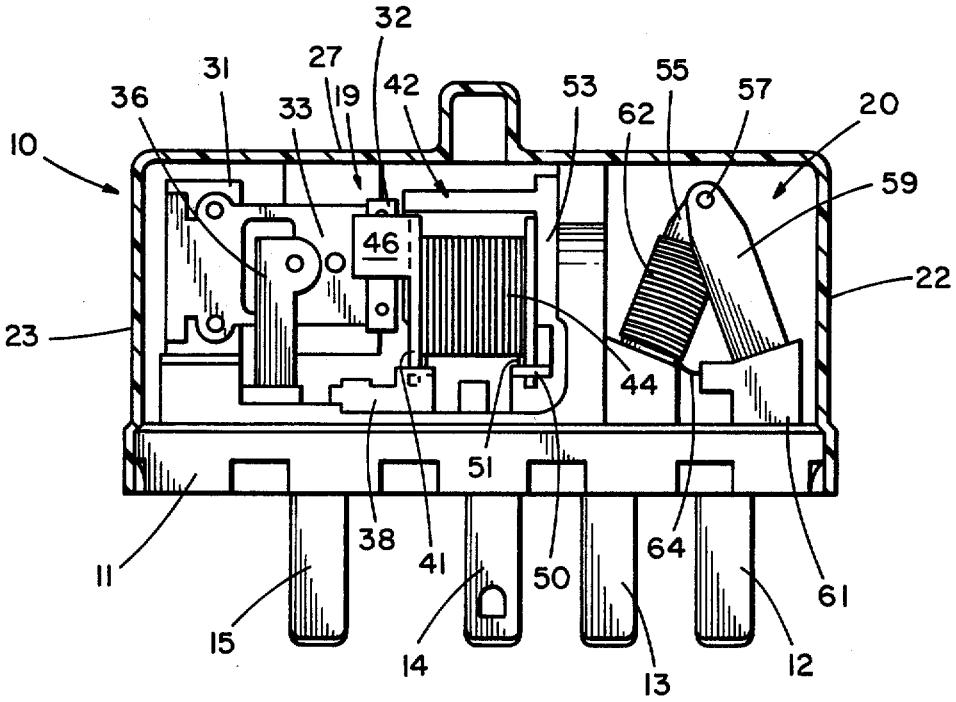
FIG. 4 is a rear longitudinal section of the buzzer assembly shown in FIG. 3.

The terminal 13, connected to warning light 49, extends through the base 11 and has a first lug portion 50 seen in FIGS. 3 and 4 that supports the other end of bobbin 41. The coil 44 is connected thereto as seen at 51 in FIGS. 3 and 4. Also integral with terminal 13 is an upstanding portion 53 that supports the coil assembly 42.

Terminal 13 has still another upwardly extending portion 54 that supports upwardly angularly extending element 55 of the bimetal timer 20. Member 55 has a contact 57 at the upper end thereof engaging contact 58 (FIG. 2) on the second bimetal element 59. Bimetal element 59 is supported on an upward projection 61 within the housing 17, formed integrally with terminal 12 which extends through and is insert molded in the base member 11. Terminal 12 receives positive voltage through the ignition switch of the associated vehicle. A heating coil 62 surrounds bimetal element 55 and serves to separate the bimetal elements when conducting thereby separating the contacts 57 and 58 after a predetermined time delay.

The heating element 62 conducts through wire 64 connected to ignition terminal 12 and wire 65 connected to an upward projection 66 on ground terminal 14, also insert molded in base 11.

Figure 5:
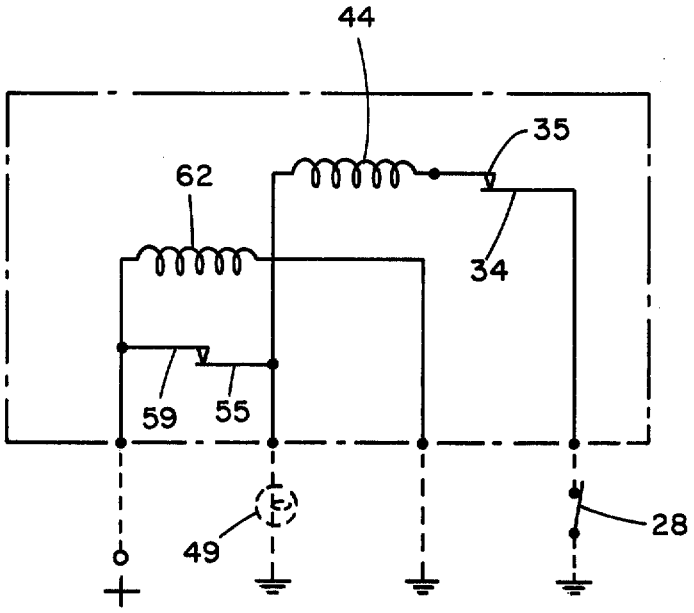
FIG. 5 is a schematic illustration of the circuit of the timed buzzer assembly.

Referring the FIGS. 3 and 5 for a description of the operation of the present buzzer, assume the ignition has been turned on and a positive bias applied to terminal 12. This provides a conductive path through the bimetal elements 59 and 55 to the coil 44 energizing the coil and pulling the armature from its normal offset position shown in FIG. 2 to an inline position with the center of coil 44. This breaks the contacts 34 and 36 and permits the flexible member 33 to drive the sounding sphere 45 on the armature into engagement with the bobbin extension 46. This again makes contacts 34 and 36, again energizing armature 44 and repeating the operation and thereby producing the buzzing sound. If however, the seat belt switch 28 is open, the buzzer will not operate. At the same time, warning lamp 49 is energized through terminal 12, bimetal elements 59 and 55 and terminal 13.

The heater 62 is conducting between ignition terminal 12 and ground terminal 14, and after a predetermined time delay contacts 57 and 58 will open and remain opened until the positive bias to terminal 14 is terminated. When these contacts open, both the lamp 49 and the buzzer will terminate operation.

What is claimed is:

1. A timed buzzer, comprising; housing means, a coil assembly mounted in said housing means, an armature supporting member, a flexible armature connected to said armature supporting member, a contact carried by said armature, a contact member supported in said housing means and being positioned to be engageable with said armature contact, said armature being positioned so that the coil, when energized, will move the armature contact out of engagement with the contact member, first terminal means connected to said armature, said contact member being connected to one end of said coil assembly, second terminal means, said second terminal means being connected to the other end of the coil assembly, said armature having sound producing means thereon, a timer assembly mounted in said housing means, said timer assembly including first and second bimetal elements, third terminal means, [one of said elements] *said first bimetal element* being connected to said third terminal means, one of said bimetal elements having heater means thereon, [another of said elements] *said second bimetal element* being connected to said second terminal means, to provide a circuit to energize said coil assembly when said third terminal means is positive, fourth terminal means for grounding, said heater means being connected to both said third terminal means and said fourth terminal means so that the heater means heats the bimetal elements whenever said third terminal means is positive opening said bimetal elements after a predetermined time delay terminating operation of the sound producing means.

2. A timed buzzer as defined in claim 1, wherein; said housing means include a separate rectangular base member and said terminal means being insert molded in said base member.

3. A timed buzzer as defined in claim 2, wherein; said housing means includes a cup-shaped housing member over said base member.

4. A timed buzzer as defined in claim 1, wherein; said first, second, third and fourth terminal means are insert molded in said base member and have portions projecting completely through said base member.

5. A timed buzzer as defined in claim 4, wherein; said first terminal means projection supports said armature.

6. A timed buzzer as defined in claim 4, wherein; said second terminal means projection supports said coil assembly.

7. A timed buzzer as defined in claim 4, wherein; said second and third terminal means projections support said bimetal elements.

8. A timed buzzer, comprising; housing means, a coil assembly mounted in said housing means, an armature supporting member, a flexible armature connected to said armature supporting member, a contact carried by said armature, a contact member supported in said housing means and being positioned to be engageable with said armature contact, said armature being positioned so that the coil, when energized, will move the armature contact out of engagement with the contact member, first terminal means connected to said armature, said contact member being connected to one end of said coil assembly, second terminal means, said second terminal means being connected to the other end of the coil assembly, said armature having sound producing means thereon, a timer assembly mounted in said housing means, said timer assembly including first and second bimetal elements, third terminal means, [one of said elements] *said first bimetal element* being connected to said third terminal means, one of said bimetal elements having heater means thereon, [another of said elements] *said second bimetal element* being connected to said second terminal means, to provide a circuit to energize said coil assembly when said third terminal means is positive, fourth terminal means for grounding, said heater means being connected to both said third terminal means and said fourth terminal means so that the heater means heats the bimetal elements whenever said third terminal means is positive opening said bimetal elements after a predetermined time delay terminating operation of the sound producing means, a base member, said first, second, third and fourth terminal means being insert molded in said base member and having portions projecting completely through said base member, said first terminal means projection supporting said armature and said second terminal means projection supporting said coil assembly.

9. A timed buzzer, comprising; housing means, a coil assembly mounted in said housing means, an armature supporting member, a flexible armature connected to said armature supporting member, a contact carried by said armature, a contact member supported in said housing means and being positioned to be engageable with said armature contact, said armature being positioned so that the coil when energized will move the armature contact out of engagement with the contact member, first terminal means connected to said armature, said contact member being connected to one end of said coil assembly, second terminal means, said second terminal means being connected to the other end of the coil assembly, said armature having sound producing means thereon, a timer assembly mounted in said housing means, said timer assembly including first and second bimetal elements, third terminal means, [one of said elements] *said first bimetal element* being connected to said third terminal means, one of said bimetal elements having heater means thereon, [another of said elements] *said second bimetal element* being connected to said second terminal means, to provide a circuit to energize said coil assembly when said third terminal means is positive, fourth terminal means for grounding, said heater means being connected to both said third terminal means and said fourth terminal means so that the heater means heats the bimetal elements whenever said third terminal means is positive opening said bimetal elements after a predetermined time delay terminating operation of the sound producing means, a base member said first, second, third and fourth terminal means being insert molded in said base member and having portions projecting completely through said base member, said first terminal means projection supporting said armature and said second and third terminal means projections supporting said bimetal elements.

10. A timed buzzer, comprising; housing means, a coil assembly mounted in said housing means, an armature supporting member, a flexible armature connected to said armature supporting member, a contact carried by said armature, a contact member supported in said housing means and being positioned to be engageable with said armature contact, said armature being positioned so that the coil when energized will move the armature contact out of engagement with the contact member, first terminal means connected to said armature, said contact member being connected to one end of said coil assembly, second terminal means, said second terminal means being connected to the other end of the coil assembly, said armature having sound producing means thereon, a timer assembly mounted in said housing means, said timer assembly including first and second bimetal elements, third terminal means, [one of said elements] *said first bimetal element* being connected to said third terminal means, one of said bimetal elements having heater means thereon, [another of said elements] *said second bimetal element* being connected to said second terminal means, to provide a circuit to energize said coil assembly when said third terminal means is positive, fourth terminal means for grounding, electrical connections between said heater means and both said third terminal means and said fourth terminal means so that the heater means heats the bimetal elements whenever said third terminal means is positive opening said bimetal elements after a predetermined time delay terminating operation of the sound producing means, a base member, said first, second, third and fourth terminal means being insert molded in said base member and having portions projecting completely through said base member, said second terminal means projection supporting said coil assembly and said second and third terminal means projections supporting said bimetal elements.

11. A timed buzzer assembly, comprising; a housing having a generally rectangular plastic base, a cup-shaped cover over said base, first, second, third and fourth terminals aligned and insert molded in said base, each of said terminals having projecting portions in said housing, a buzzer assembly including a coil assembly supported on said second terminal, an armature supported on the first of said terminals in alignment with the coil assembly, a contact member insert molded in said base and projecting upwardly from said base adjacent said armature, bimetal elements supported on said second and third terminals and having engaging contacts therein, defining a circuit between said second and third terminals and between said first and third terminals through the buzzer assembly, a heater on one of said bimetal elements connected to said third and fourth terminals, said first terminal adapted to be connected to a normally closed seat belt switch, said second terminal being adapted to be connected to a warning light, said third terminal being adapted to be connected to a source of voltage, and said fourth terminal being adapted to be connected to ground.

* * * * *